United States Patent [19]

Henze et al.

[11] 4,428,139
[45] Jan. 31, 1984

[54] TROLLING APPARATUS

[75] Inventors: Walter J. Henze, Norristown; William Purcell, Philadelphia, both of Pa.

[73] Assignee: Penn Fishing Tackle Mfg. Co., Philadelphia, Pa.

[21] Appl. No.: 284,704

[22] Filed: Jul. 20, 1981

[51] Int. Cl.³ .................................. A01K 89/015
[52] U.S. Cl. .................................. 43/20; 43/27.4; 242/84.51 R
[58] Field of Search ............... 43/20, 21, 27.4; 242/84.51 R, 84.1 A; 116/67 A, 67 R

[56] References Cited

U.S. PATENT DOCUMENTS

| 386,705 | 7/1888 | Graham | 242/84.51 R |
| 865,613 | 9/1907 | Schreidt | 242/215 |
| 3,241,788 | 3/1966 | Visockis | 242/84.51 R |
| 3,630,166 | 12/1971 | Riddle | 242/84.51 R |
| 3,659,808 | 5/1972 | Fleischer | 242/84.1 R |
| 3,937,415 | 2/1976 | Prinz | 43/27.4 |
| 3,961,438 | 6/1976 | Henze et al. | 43/27.4 |
| 3,967,405 | 7/1976 | Henze et al. | 43/27.4 |
| 4,167,829 | 9/1979 | Henze et al. | 43/27.4 |

FOREIGN PATENT DOCUMENTS 795401 9/1935 France.

Primary Examiner—Nicholas P. Godici
Assistant Examiner—Charles L. Willis
Attorney, Agent, or Firm—Z. T. Wobensmith, III

[57] ABSTRACT

Trolling apparatus is disclosed for controlled depth trolling which includes a spring urged pin which can be turned to an "on" position where it is retained so that the pin can be successively engaged by members on the spool to provide an audible sound when the line is being drawn out by a fish on the line or which can be turned to an "off" position so that the pin is moved to a position out of engagement with the members on the spool.

1 Claim, 6 Drawing Figures

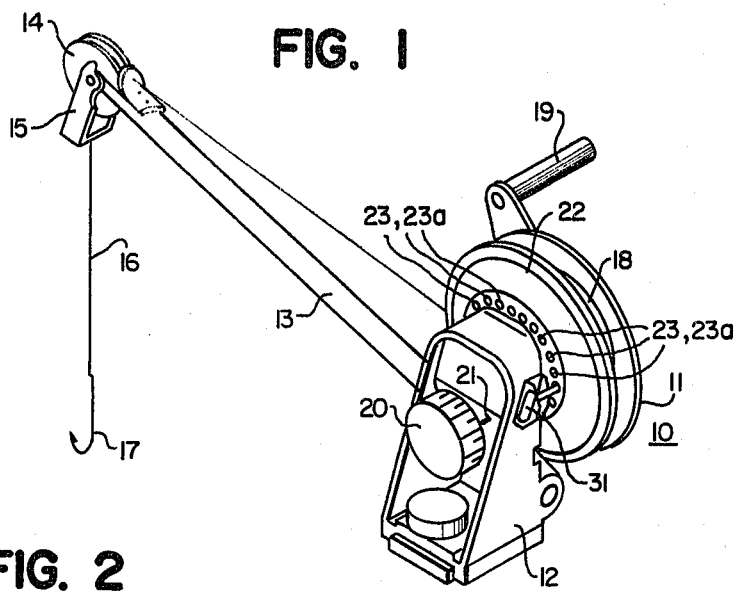
FIG. 1
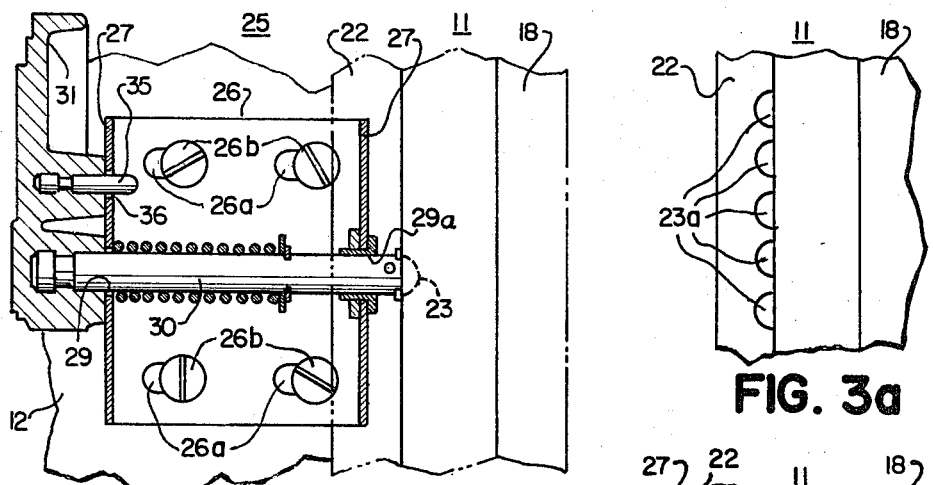
FIG. 2
FIG. 3a
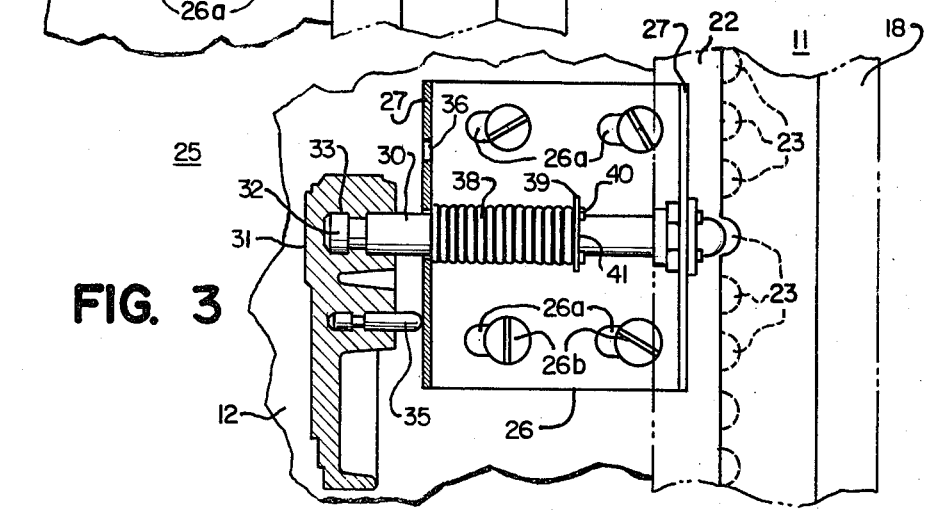
FIG. 3

TROLLING APPARATUS

BACKGROUND OF THE INVENTION

1. Field of the Invention

This invention relates to trolling apparatus of the reel and boom type for controlled depth trolling and which can give an audible signal when the line is being drawn out.

2. Description of the Prior Art

While various types of controlled depth trolling apparatus have heretofore been available, such as that shown in U.S. Pat. Nos. 3,961,438, 3,967,405 and 4,167,829 but the structures there shown are not intended for nor capable of giving an audible signal.

Graham, in U.S. Pat. No. 386,705 shows a fishing reel which includes discs C, C' with central cylindrical connecting projections to provide a spool. A click pin D is provided urged by a spring m and the inner face of the disc C' is provided with serrations n for engagement by the click pin D to provide a warning when the line is unwound from the spool and to provide a brake to retard too free revolution of the spool. The pin D is not at an accessible location and no provisions are made for retraction of the pin.

Schreidt, in U.S. Pat. No. 865,613 shows a fishing reel having a spool 16 with a spring actuated pin 77 which meshes with a notch 78 in the path of the pin 77 when the line is being cast. An annular series of perforations 79 are found on the spool. A boss 80 projects from the side and has a spring actuated pin 87 with its end flattened in the path of the perforations 79 and adapted to register therewith. A projecting portion 89 on the pin 87 can be positioned in slots 90 and 90a of different depths at right angles with each other. When the fishing line is being drawn from the spool the pin 87 is in contact with the rack and as the spool is rotated an audible alarm is given by the contact of the pin with the rack.

Visockis, in U.S. Pat. No. 3,241,788 shows a plastic fishing reel with a brake and clicker. The flat wall 40 of the spool 22 (see FIG. 3) has a plurality of circumferentially spaced integral nubs 60 near the edge of the spool. A slidable mounted clicker member 64 is provided having a clicker foot 68 slidable to a position to engage the nubs 60 upon rotation of the spool 22 and is slidable to an out of engaging position with the nubs 60. The intensity of the clicking action is controlled by the adjustable drag means. Visockis does not employ a rectractible resiliently urged pin to provide an audible signal.

French Pat. No. 795,401 to Kostos etc. shows bosses or projections 19 for engagement with a plate 20 mounted on the frame for adjustment by a lever 7. This patent does not suggest a retractible resiliently urged pin to provide an audible signal.

None of the prior art patents makes provisions for adjustment of the initial positioning of the pin or plate with respect to the actuating members engaged therewith.

SUMMARY OF THE INVENTION

In accordance with the invention trolling apparatus is provided of the reel and boom type for controlled depth trolling and which is adjustable to an "on" or an "off" position so that when it is in the "on" position and when the line is being drawn out by a fish an audible signal is provided to alert the boat operator or the fisherman, provisions also being made for initial adjustment of the position of the pin with respect to the actuating members on the spool.

The principal object of the invention is to provide trolling apparatus of the reel and boom type for controlled depth trolling and with improved features and in which the reel, in an "on" position and when the line is being drawn out by a fish an audible signal is provided to alert the boat operator or the fisherman.

It is a further object of the invention to provide, in apparatus as aforesaid for a control for the audible signal comprising an adjustably positioned resiliently impelled member having an end portion for movement to a position for engagement with members on the outer face of the spool of the reel and for movement to a position out of engagement with the members on the outer face of the spool of the reel.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof in which:

FIG. 1 is a view in perspective of trolling apparatus in accordance with the invention;

FIG. 2 is a fragmentary sectional view, enlarged, showing the control for the audible signal in a position for use;

FIG. 3 is a fragmentary sectional view, showing the control for the audible signal in an out of use position;

FIG. 3A is a fragmentary view in elevation showing a modified form of the invention;

Figure 4:
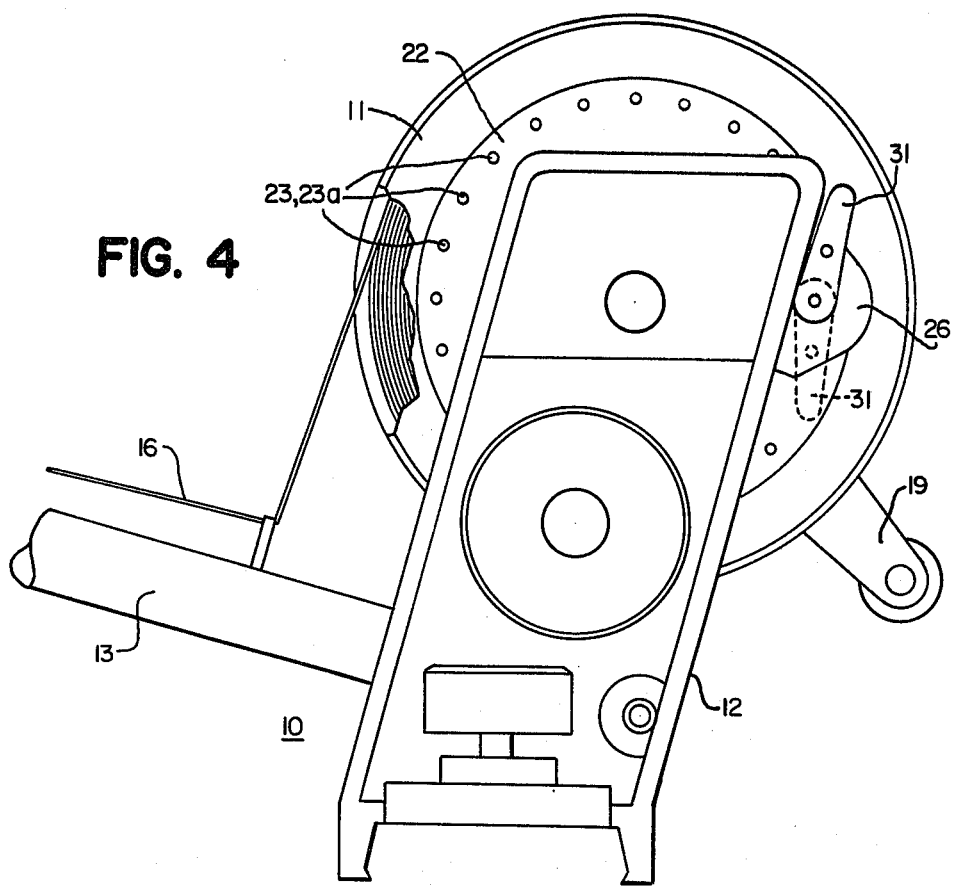
FIG. 4 is a view in elevation with parts broken away and showing the outer side face of the spool with the members on the outer face of the spool of the reel to provide an audible alarm.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings and FIGS. 1 to 5, inclusive, a reel 10 is provided, made of any desired material such as synthetic plastic, which includes a spool 11 carried on a shaft (not shown) in a frame assembly 12, such as is more fully shown in U.S. Pat. No. 3,961,438. The frame assembly 12 is adapted to be secured to any suitable portion of the boat which is employed for trolling. The frame assembly 12 has a hollow boom 13 carried thereby with a pulley 14 at its free end and, if desired, a pivoted guide bracket 15, for engagement with a line 16 extending over the pulley 14, and to which a hook 17 is attached.

The spool 11 is rotatable for winding the line onto a groove 18 on its periphery, a handle 19 being provided for rotating the spool 11. The spool 11 may have an adjustable drag (not shown) and a counter 20 and a pointer 21, as heretofore.

The outer side face 22 of the spool 11 is preferably provided with a plurality of spaced circularly arranged indentations 23 (FIG. 2) or protrusions 23a (FIG. 3A).

Figure 5:
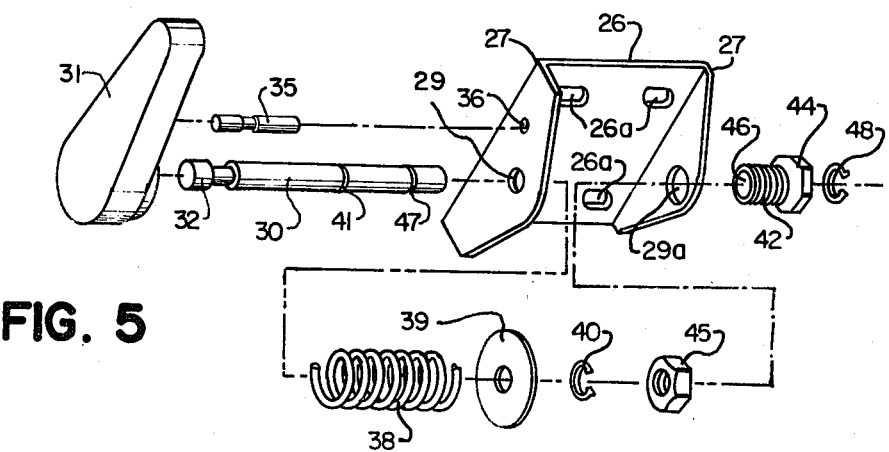
FIG. 5 is an exploded perspective view of the control for the audible signal.

A control 25 is provided as shown in detail in FIGS. 2, 3 and 5 and includes an adjustably mounted bracket 26 having slots 26a through which bolts 26b extend. The bracket 26 is secured at the desired adjusted horizontal position to the frame assembly 12.

The bracket 26 has axially aligned openings 29 and 29a in bracket legs 27 for the reception of a pin 30 to which an operating handle 31 is secured. The pin 30 has an extension 32 extending through and is molded in an opening 33 in the operating handle 31. The operating handle 31 has a positioning pin 35 molded therein for engagement in an opening 36 in the bracket 26 and for engagement with one of the bracket legs 27.

Interiorly of the legs 27 and carried on the pin 30 a compression spring 38 is provided having a washer 39 in engagement with the inner end of the spring 38. A split spring washer 40 to retain the spring 38 and washer 39 is provided in engagement in a groove 41 on the pin 30.

The inner end of the pin 30 is guided in a hollow guide sleeve 42 retained in the opening 29a in one of the bracket legs 27 by a head portion 44 and a nut 45. The sleeve 42 has an opening 46 therethrough for the slidable and rotatable reception of the pin 30.

The pin 30 can be moved by the operating handle 31 and upon compression of the spring 38 to withdraw the positioning pin 35 from the opening 36 and turned so that the positioning pin 35 engages the outer face of the bracket leg 27 in which the opening 36 is located to remove the pin from engagement with the indentations 23 or the protuberances 23a.

It is preferred, however, that if required, the bracket 26 be adjusted by the bolts 26b, to the proper positioning with respect to the indentations 23 or the projections 23a.

The pin 30 has a groove 47 for the reception of a split spring washer 48 which provides a stop limiting the retraction of the pin 30 by movement of the operating handle 31.

The mode of use will be apparent from the foregoing.

It will be noted that if an audible signal is desired the handle 31 is turned so that the positioning pin 35 extends through the opening 36 and so that the free end of the pin 30 can engage, as the spool 11 turns to release the line 16, with the indentations 23 or the protuberances 23a. Such engagement of the free end of the pin 30 provides an audible signal.

If no audible signal is desired, the handle 31 can be moved to the position shown in FIG. 3 and to the position shown as dotted in FIG. 4 so that no engagement of the free end of the pin 30 can occur.

We claim:

1. In trolling apparatus for fishing, which includes a base, a spool for carrying a supply of line rotatably mounted on said base, a boom secured at one end to said base, which boom has a pulley at its free end over which the line extends, the improvement which comprises, audible signal means comprising a bracket mounted on said base contiguous to one side face of the spool, said side face having in a circular arrangment thereon a plurality of members, said bracket having a first pin resiliently urged toward said members to provide upon engagement with said members and rotation of said spool an audible signal, said first pin being movable to a retracted position to prevent engagement of said pin with said members thereby to prevent an audible signal, a control member for said first pin which comprises a handle secured to said pin for moving said first pin to a retracted position, a second pin secured to said handle for engagement in a portion of said bracket to permit engagement of said first pin with said members to provide an audible signal, and said handle being rotatable after said second pin is retracted to prevent engagement of said first pin with said members.

* * * * *

UNITED STATES PATENT AND TRADEMARK OFFICE
CERTIFICATE OF CORRECTION

PATENT NO. : 4,428,139

DATED : January 31, 1984

INVENTOR(S) : Walter J. Henze and William Purcell

It is certified that error appears in the above—identified patent and that said Letters Patent is hereby corrected as shown below:

Column 2,

Line 67, after "counter" insert - wheel -

Signed and Sealed this

Twenty-fourth Day of April 1984

[SEAL]

Attest:

GERALD J. MOSSINGHOFF

Attesting Officer

Commissioner of Patents and Trademarks